INVENTOR.
EARL R. PRICE

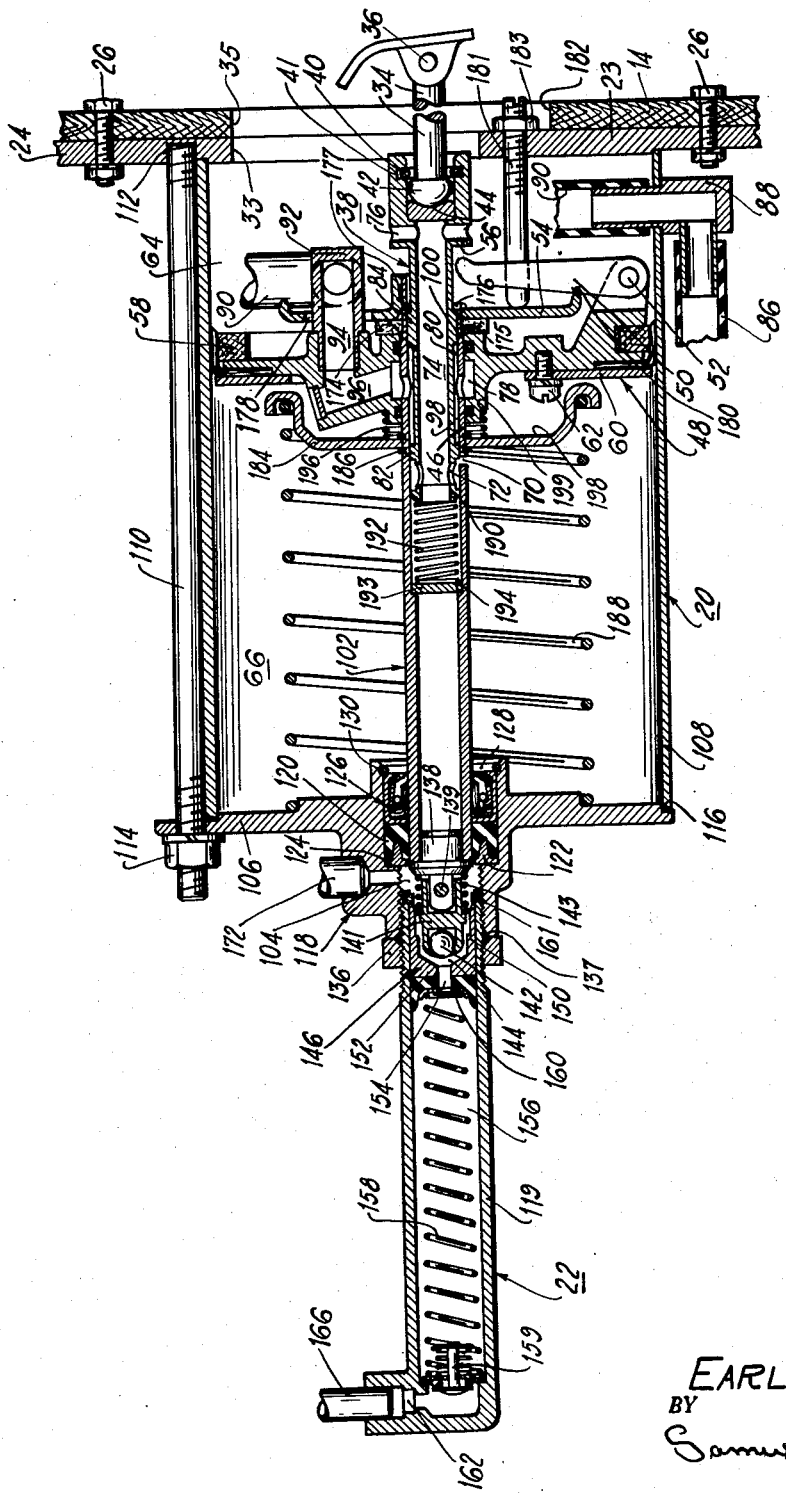

United States Patent Office 2,857,743
Patented Oct. 28, 1958

2,857,743

POWER ASSISTED MASTER CYLINDER

Earl R. Price, South Bend, Ind., assignor to Bendix Aviation Corporation, South Bend, Ind., a corporation of Delaware Application March 29, 1954, Serial No. 419,361

7 Claims. (Cl. 60—54.6)

This invention relates to a power assisted master cylinder, i. e., a hydraulic pressure producing device in which physical operating force is supplemented by power assistance. The device is intended primarily as an actuator for a vehicle brake system, although other uses are possible.

Power assisted master cylinder units similar to the device disclosed herein are shown and claimed in my earlier co-pending applications, Serial Nos. 366,540 filed July 7, 1953, now Patent No. 2,685,172, a continuation of application 110,816 filed on August 17, 1949, now abandoned, 167,681, filed June 12, 1950, now Patent No. 2,685,170, and 196,854 filed November 21, 1950, now Patent No. 2,685,171. The primary object of the present invention is to provide a device of this type incorporating a simplified arrangement for obtaining "feel." In the present device, the operator's pressure or "feel" has a proportional relationship with the total effort exerted by the master cylinder through the use of one or more floating reaction levers. This arrangement eliminates the need for the hydraulic reaction means of applications 366,540 and 196,854 or the diaphragm reaction as disclosed in application No. 167,681.

Another important object is to provide in a power-assisted master cylinder utilizing mechanical reaction means for delaying the immediate reaction force caused during the initial portion of the brake-applying stroke.

The pressure required to initiate the braking action is kept as low as possible, subject to the limitation that only a slight deceleration should occur before the reaction member becomes effective. In other words, the initial treadle pressure is low, so that the weight of the operator's foot can of itself actuate the valve to cause the shoes to take up a substantial amount of the shoe-to-drum clearance, before the reaction build-up begins. The initial lack of reaction force, followed by a normal reaction build-up as the retarding torque is developed, provides, in effect, a "two-stage" reaction which gives the operator a correct, and at the same time pleasant, "feel" indicative of the progress of the brake application.

The above and other objects and features of the invention will appear more fully hereinafter from a consideration of the following description, taken in connection with the accompanying drawings in which:

Figure 2 is a sectional view of my improved power-assisted master cylinder unit showing the internal construction thereof.

Figure 1:
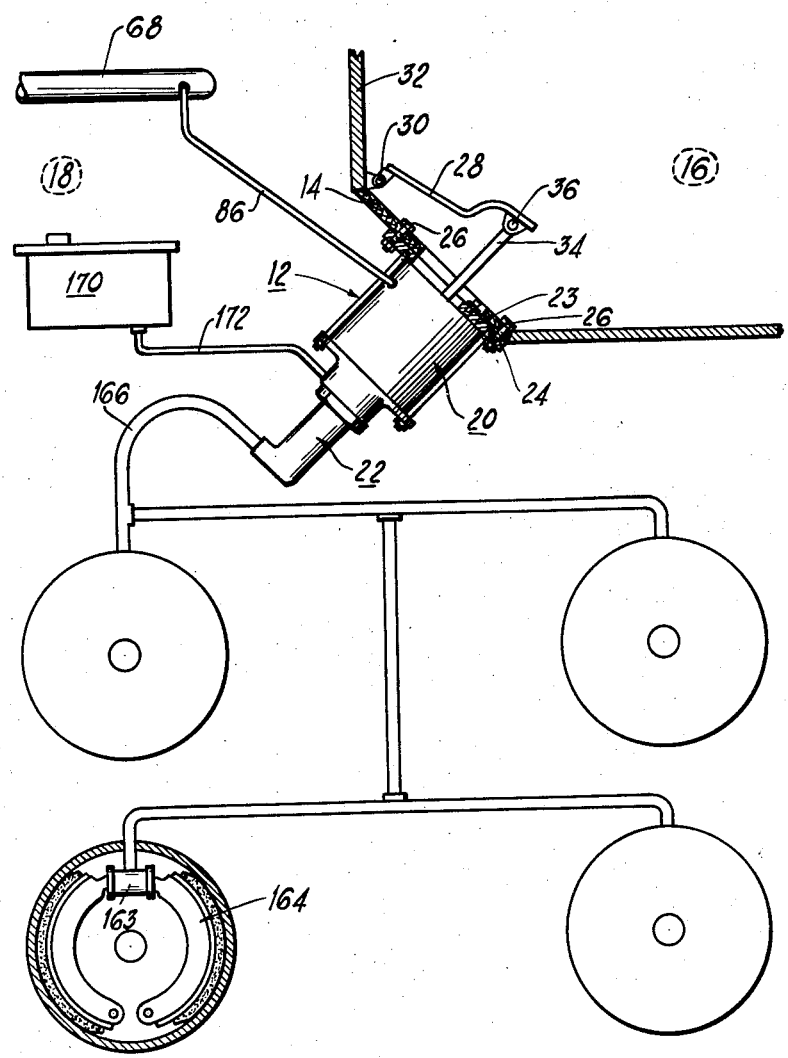
Figure 1 is a view showing the brake-operating system diagrammatically with the power-assisted master cylinder unit mounted directly against the underside of the toeboard of a vehicle.

As shown in Figure 1, the power-assistor master cylinder unit 12 is secured directly to the engine side of toeboard 14, the toeboard being the slanting lower portion of the wall which separates the driver's compartment 16 from the engine compartment 18. The power-assisted master cylinder comprises a power cylinder 20 and a hydraulic cylinder 22 mounted on the front end of the power cylinder. The power cylinder casing includes an end plate 23 having a flange portion 24 which is secured by fastening members 26 to the toeboard.

The power-assisted master cylinder unit is controlled by a treadle 28, pivoted at 30 on the driver's compartment side of the firewall 32. The treadle may be pivoted at its lower end, similar to a conventional accelerator treadle, if preferred. A control rod 34 is pivotally connected at 36 to the treadle 28, and extends into the power-assisted master cylinder unit to control its operation. The toeboard and end plate of the power unit include openings 33 and 35, respectively, which permit the entrance of rod 34 therethrough.

As shown in Figure 2, the end of rod 34 opposite pivot 36 operatively engages a valve control member 38. The rod 34 is connected to the valve control member 38 by means of a retainer ring 40 secured in recess 41 of member 38 by means of an enlarged ball-shaped end portion 42 of the rod 34 which permits limited universal movement of said rod during brake actuation. The applying force on the pressure stroke is transferred directly from the ball-shaped end 42 of the rod 34 to a spherical recess 44 provided in the valve control member. The valve control member 38 is in the form of a slide valve which cooperates with a sleeve 46 to control operation of the power piston.

Power piston 48 provides a pressure-responsive movable wall, which is reciprocably mounted in power cylinder 20, which carries one or more reaction levers 50; only one being shown in Figure 2 to preserve clarity in the drawing, however, it is obvious that several of such levers may be spaced around the power piston. The reaction lever 50 is pivotally secured at 52 to the power piston and is movable therewith during a power stroke, and engages a force transmitting plate 54 and flange 56 during actuation of the valve control member 38 in a manner to be subsequently described. A suitable packing 58 is supported on the periphery of the power piston by a ring 60 secured to the power piston by means of screws 62, for example.

Although other types of power devices may be employed, I herein disclose a differential air pressure power cylinder of the vacuum type, in which the unit is "atmosphere-suspended" when released. Accordingly, chamber 64 is permanently connected to the atmosphere through the openings 33 and 35 of the casing and toeboard, respectively. However, the atmosphere compartment 64 could be closed off to prevent the entrance of dust as disclosed in my previously mentioned co-pending application 167,681, for example.

Valve member 38 selectively controls the communication of compartment 66 with either the atmosphere in chamber 64, or the vacuum source, such as the usual intake manifold 68. In the position shown in Figure 2, chamber 66 is connected to atmosphere chamber 64 through port 70 in sleeve 46, ports 72 and hollow passage 74 in member 38, and ports 76. Vacuum is in constant communication with an annular recess 78 formed in the power piston, and an annular recess 80 formed by lands 82 and 84, through a conduit 86 leading from manifold 68 to a fitting 88, a coiled hose 90, and fitting 92 and passages 94 and 96. When valve member 38 is moved toward the left, land 82 moves by port 70 and communication of chamber 66 is cut off from the atmosphere, continued movement of member 38 communicates the vacuum source through recess 80 and port 70 to chamber 66, thus causing a pressure-differential to exist across power piston 48. Included on each side of the annular recess 78 between sleeve 46 and piston 48 are annular sealing members 98 and 100 for preventing vacuum leakage from said recess to the chambers 64 and 66.

Sleeve 46 extends through power piston 48, thus providing a thrust element in the form of a hollow member 102 which extends into a chamber 104 formed in the end plate 106 of the power cylinder 20. The end plate 106 is secured to a shell 108 of the cylinder 20 by means of a plurality of rods 110, only one being shown in Figure 2, by means of tapped holes 112 in end plate 24 and nuts 114 on the ends of rods 110. A suitable sealing means 116 can be provided to insure a vacuum tight seal between plate 106 and shell 108. The power cylinder might be constructed as that shown in the previously mentioned application 167,681.

End plate 106 includes a tubular extension 118 which contains chamber 104; chamber 104 being sealed from chamber 66 about thrust rod 102 by means of a lip type seal 120, seal retainer ring 122 which abuts shoulder 124 on member 118, wiper seal 126, and lock ring 128 in groove 130 in extension 118.

Extension 118 has internal threads into which is threaded tubular hydraulic cylinder sleeve 119, which is held in place by a lock nut 136, a seal 137 being included between 136 and 118 to prevent leakage past the threads.

Mounted on the end of rod 102 located in chamber 104 is a plug member 138, which may be brazed therein, and which has secured thereto by means of pin 139 a ball carrying member 141 which carries ball member 142. A spring 143 surrounds the portion of member 141 secured to plug 138 and retains pin 139 in place. Member 141 extends into a recess 144 of a reciprocable hydraulic cylinder piston 146 and reciprocates therein for the purpose to be subsequently described. Piston 146 consists of rear and forward portions 150 and 152, respectively having a fluid passage 154 therethrough operatively associated with ball member 142.

The sleeve 119 includes a pressure chamber 156 in which fluid under pressure is displaced by piston 146. A return spring 158 is located in chamber 156 abutting a check valve 159 at one end and a retainer plate 160 in contact with piston-portion 152. Secured to the portion of sleeve 119 in chamber 104 is a stop member 161 positioned to contact piston-portion 150, permitting ball 142 to open passage 154 in brake-released position. The sleeve 119 has a pressure port 162 in communication with the usual brake cylinders 163 of brake assembly 164 to which fluid pressure is directed through conduit 166, as shown in Figure 1. The check valve 159 is for the purpose of maintaining residual-line-pressure in the brake system in a manner well known in the art.

Chamber 104 is in communication with a fluid reservoir 170 through conduit 172, said reservoir compensating for fluid losses in the brake system. Chamber 104 is in communication with pressure chamber 156 in a brake-released position, however, such communication is closed off by ball 142 upon leftward movement of thrust rod 102 which moves piston 146 and causes a pressure build-up in chamber 156. A compensating reservoir and valve arrangement as shown in the previously mentioned application 167,681 could be utilized in the device herein disclosed.

The portion of sleeve 46 in chamber 64 has secured thereon, by means of brazing or any other suitable manner, a force-transmitting plate 54 which has on one side thereof a washer member 174 of fiber or any other suitable material, held in abutting relationship against a shoulder 175 on the outside of sleeve 46 and on the opposite side a stop member 176 retained in a groove 177 on sleeve 46, arranged to contact valve member 38. An aperture 178 is included in plate 54 to permit passage of fitting 92.

The previously mentioned reaction transmitting member 50 is pivotally carried by piston 48, said reaction member 50 engageable by force transmitting plate 54 at 180. A stop member 181 is arranged on end 23 of the power cylinder and limits rearward movement of plate 54 and sleeve 46 secured thereto. The stop member may be adjustable through aperture 182 in the toeboard by means of nut 183.

Thrust rod member 102 has mounted thereon, adjacent the power piston, a return spring plate 184 held by means of lock members 186. A return spring 188 abuts plate 184 and the inner side of end 106 of the power cylinder, urging the force transmitting plate 54 into contact with stop 180 as shown in Figure 2.

The valve member 38 includes adjacent its forward end a flange 190 engaged by a light valve return spring 192 which engages a washer 193 abutting a shoulder 194 in the rod 102. The spring 192 urges valve 38 into contact with stop 176 secured to sleeve 46.

A reaction delaying spring 196 is interposed between side 198 of plate 184 and a forward portion 199 of power piston 48. This spring urges piston 48 toward washer 174. The piston 48 is thus reciprocably mounted on sleeve 46, the limits of reciprocation being between washer 174 and side 198 of plate 184.

Operation of the device is as follows:

Operator pressure on treadle 28 causes leftward movement of valve member 38 overcoming valve return spring 192 in sleeve 46; land 82 is moved past port 70 in sleeve 46 and closes off communication of said port with atmosphere chamber 64 through port 72, passage 74 and port 76; continued movement of valve member 38 results in communicating port 70 with vacuum recess 78 and creation of a vacuum in chamber 66, thus causing a pressure-differential across piston 48. Continued leftward movement of valve member 38 results in flange 56 contacting reaction lever 50. As power piston 48, due to pressure-differential, moves toward the left, spring 196 is compressed, reaction lever 50 secured to the piston at 52 is also moved, however, since lever 50 is pivotally fixed at 52 it is urged against 54 at point 180 and against flange 56 of valve member 38. The force caused by the pressure-differential on piston 48 is transmitted to the operator as "feel" reaction in proportion to location of the point of contact 180 of lever 50 with the force transmitting plate 54. The reaction or "feel" is transmitted to the operator through the contact of flange 56 of valve member 38 with lever 50, through rod 34 to the treadle 28.

It can be seen that the reaction lever 50 functions in effect as a "walking beam," i. e. as valve member 38 is moved leftward while in contact with lever 50 through flange 56, a given amount of force is applied; since this force causes a pressure-differential across piston 48 secured to the lower portion of lever 50, the force applied by the operator is additive to that of the power piston. These two forces will equal or balance that exerted on the thrust plate 54 at contact point 180, causing thrust rod 102 and piston 146 to move into pressure chamber 156 to build-up fluid pressure for a given braking condition.

As previously mentioned, initial movement of the power piston overcomes spring 196, however, reaction at flange 56 is not felt until this flange contacts the lever 50. The travel of slide valve member 38 is predetermined, and the parts are so proportioned that the first increment of force caused by the pressure-differential on the power piston results in the taking up of brake clearances and is in effect a "delayed" reaction, since no reaction is felt by the operator until flange 56 later comes into contact with lever 50 due to continued leftward movement of valve member 38. Force being exerted on thrust transmitting plate through the reaction lever 50, of which there will probably be at least three equidistantly spaced around power piston 48, results in spring 188 being compressed; ball 142 closing passage 154 due to leftward movement of thrust member 102; pressure build-up in chamber 156 due to piston leftward movement of piston 146; compression of spring 158 and resulting in fluid pressure being directed to brake cylinders 162 past check valve 159.

When the operator pressure at treadle 28 is held constant for a preferred brake condition, valve 38 having moved the distance required to obtain such a condition, subsequent movement of sleeve 46 toward the left due to the pressure differential on the power piston causes the port 70 to be closed by land 82 of sleeve 46 and the control valve is in a "lapped" condition.

In the event of "power run-out" or absence of power assistance, application of pressure on the treadle 28 will result in flange 56 contacting the lever 50 which contacts force transmitting plate 54 and would result in the leftward movement of piston 146 and fluid pressure build up in chamber 156 in a manner similar to that of a conventional master cylinder.

Release of operator foot pressure on treadle 28 results in valve return spring 192 urging valve member 38 toward the right to abut stop 176; land 82 cuts off vacuum communication of chamber 66 with vacuum recess 78, and port 70 again communicates with chamber 64, as previously mentioned; spring 188 urges thrust rod 102 toward the right since plate 184 is secured thereon and force transmitting plate 54 contacts stop 181; the power piston is urged into engagement with washer 174 due to spring 196; ball 142 moves to the right with thrust rod 102 and spring 158 urges piston 146 toward the right till it abuts stop 161 whereby continued rightward movement of ball 142 opens communication between chambers 104 and 156 with the fluid reservoir compensating for any fluid losses; the residual pressure check valve retains residual-line-pressure in the brake system.

In the foregoing specification and in the appended claims, the identifying terms used are intended to convey meanings which include the range of equivalent elements. For example, the term "power cylinder" is intended to mean any casing or chamber having a pressure responsive movable member therein, whether such movable member be a piston, diaphragm, or any other structure having an equivalent function. Either of the terms "piston" or "diaphragm" embrace a rigid piston, flexible diaphragm, or any other pressure responsive movable wall. The terms "front" and "rear," and any other directional terms, are intended to have only relative connotation, for convenience of descrpition of the structure, and are not intended to be interpreted as requiring any particular orientation with respect to external elements.

Although a particular embodiment of my invention has been described; it will be understood by those skilled in the art that the objects of invention may be attained by the use of constructions different in certain respects from that disclosed without departing from the underlying principles of the invention.

I claim:

1. A power-assisted master cylinder comprising a power chamber, a hydraulic cylinder at the front of the power chamber, a piston reciprocable in the hydraulic cylinder, the space ahead of the piston communicating with a discharge port and the space behind the piston communicating with a reservoir, the piston having an opening which permits communication between the reservoir and the discharge port when the piston is in released position, a pressure responsive movable wall in the power chamber, a pressure-transmitting member having one end which extends into the hydraulic cylinder and having a sleeve at the other end which extends through the movable wall, said movable wall being reciprocable with respect to said sleeve, the front end of the pressure-transmitting member being adapted to close the opening in the hydraulic piston and thereafter move the piston forward, a collar carried by the sleeve in front of the movable wall, a spring on said pressure-transmitting-member interposed between the collar and movable wall, a return spring compressed between the collar and the front wall of the power chamber, a valve control member having a forward portion slidably mounted in the sleeve and a larger diameter rear portion behind the movable wall, a valve spring in said pressure transmitting member urging said valve control member to a power-off condition, an outwardly extending flange on the sleeve behind the movable wall, a manually-operated rod connected by a ball-and-socket joint to the rear portion of the valve control member, and a plurality of angularly-spaced radially-extending levers each of which has one end in pivotal engagement with the peripheral portion of the movable wall, the other end being in pivotal engagement with the rear portion of the valve control member, and an intermediate point in pivotal engagement with the outer edge of the sleeve flange.

2. A power-assisted master cylinder comprising a power chamber, a hydraulic cylinder at the front of the power chamber, a piston reciprocable in the hydraulic cylinder, the space ahead of the piston communicating with a discharge port and the space behind the piston communicating with a reservoir, the piston having an opening which permits communication between the reservoir and the discharge port when the piston is in released position, a pressure responsive movable wall in the power chamber, a pressure-transmitting member having one end which extends into the hydraulic cylinder and having a sleeve at the other end which extends through the movable wall, the front end of the pressure-transmitting member being adapted to close the opening in the hydraulic piston and thereafter move the piston forward, a collar carried by the sleeve in front of the movable wall, a return spring compressed between the collar and the front wall of the power chamber, a valve control member having a forward portion slidably mounted in the sleeve and a larger diameter rear portion behind the movable wall, an outwardly extending flange on the sleeve behind the movable wall, a manually-operated rod connected by a ball-and-socket joint to the rear portion of the valve control member, and a plurality of angularly-spaced radially-extending levers each of which has one end in pivotal engagement with the peripheral portion of the movable wall, the other end being in pivotal engagement with the rear portion of the valve control member, and an intermediate point in pivotal engagement with the outer edge of the sleeve flange.

3. A power-assisted master cylinder comprising a power chamber, a hydraulic cylinder at the front of the power chamber, a piston reciprocable in the hydraulic cylinder, the space ahead of the piston communicating with a discharge port and the space behind the piston communicating with a reservoir, the piston having an opening which permits communication between the reservoir and the discharge port when the piston is in released position, a pressure responsive movable wall in the power chamber, a pressure-transmitting member having one end which extends into the hydraulic cylinder and having a sleeve at the other end which extends through the movable wall, said movable wall being reciprocable with respect to said sleeve, the front end of the pressure-transmitting member being adapted to close the opening in the hydraulic piston and thereafter move the piston forward, a return spring in the power chamber urging the sleeve toward retracted position, a valve control member having a forward portion slidably mounted in the sleeve and a rear portion behind the movable wall, resilient means between said movable wall and pressure-transmitting member urging the movable wall toward a retracted position, an outwardly extending flange on the sleeve behind the movable wall, a manually-operated rod connected to the rear portion of the valve control member, and a radially-extending lever having one end in pivotal engagement with the peripheral portion of the movable wall and the other end in pivotal engagement with the rear portion of the valve control member, and an intermediate point in pivotal engagement with the outer edge of the sleeve flange.

4. A power-assisted master cylinder comprising a power chamber, a hydraulic cylinder at the front of the power chamber, a piston reciprocable in the hydraulic cylinder, the space ahead of the piston communicating with a discharge port and the space behind the piston communicating with a reservoir, the piston having an opening which permits communication between the reservoir and the discharge port when the piston is in released position, a pressure responsive movable wall in the power chamber, a pressure-transmitting member having one end which extends into the hydraulic cylinder and having a sleeve at the other end which extends through the movable wall, the front end of the pressure-transmitting member being adapted to close the opening in the hydraulic piston and thereafter move the piston forward, a return spring in the power chamber urging the sleeve toward retracted position, a valve control member having a forward portion slidably mounted in the sleeve and a rear portion behind the movable wall, an outwardly extending flange on the sleeve behind the movable wall, a manually-operated rod connected to the rear portion of the valve control member, and a radially-extending lever having one end in pivotal engagement with the peripheral portion of the movable wall and the other end in pivotal engagement with the rear portion of the valve control member, and an intermediate point in pivotal engagement with the outer edge of the sleeve flange.

5. A power-assisted master cylinder comprising a power chamber, a hydraulic cylinder at the front of the power chamber, a piston reciprocable in the hydraulic cylinder, a pressure responsive movable wall in the power chamber, a pressure-transmitting member having one end which extends into the hydraulic cylinder and having a sleeve at the other end which extends through the movable wall, said movable wall having limited reciprocable movement with respect to said sleeve, the pressure transmitting member being adapted to move the piston forward, a return spring in the power chamber urging the sleeve toward retracted position, reaction-delaying means engaging the movable wall urging it toward a retracted position, a valve control member having a forward portion slidably mounted in the sleeve and a rear portion behind the movable wall, an outwardly extending flange on the sleeve behind the movable wall, a manually-operated rod connected to the rear portion of the valve control member, and a radially-extending reaction lever means which is in pivotal engagement with the peripheral portion of the movable wall at one end, and in pivotal engagement with the rear portion of the valve control member at the other end and having an intermediate point in pivotal engagement with the outer edge of the sleeve flange.

6. A power-assisted master cylinder comprising a power chamber, a hydraulic cylinder at the front of the power chamber, a pressure responsive movable wall member in the power chamber, a fluid displacement member having one end which extends into the hydraulic cylinder and the other end of which extends into the movable wall, said movable wall member being movable forwardly relative to said fluid displacement member, and said fluid displacement member having abutment means limiting rearward movement of said movable wall member relative to said fluid displacement member, biasing means urging the movable wall member rearwardly into engagement with said abutment means with generally predetermined force, a valve control member which when moved forwardly relative to said fluid displacement member produces a pressure differential across said movable wall member urging said movable wall member forwardly and a lever operatively positioned for pivotal engagement with said movable wall member, said fluid displacement member and said control member at spaced points to transmit reaction force from said fluid displacement member to said control member when said movable wall member overcomes said biasing means and moves out of engagement with said abutment means, there being a lost motion connection between said lever and one of said members for permitting limited movement of said movable wall member away from said abutment means without said lever engaging said one of said members, and there being no connection between said lever and said one of said members which will transmit a force therebetween that changes significantly as movement of said lever takes up the lost motion in said lost motion connection, whereby substantially no reaction force is transmitted to said control member until a generally predetermined hydraulic pressure is reached in said hydraulic cylinder.

7. A power-assisted master cylinder comprising a power chamber, a hydraulic cylinder at the front of the power chamber, a pressure responsive movable wall in the power chamber, a fluid displacement member having one end which extends into the hydraulic cylinder and the other end of which extends into the movable wall, said movable wall being movable forwardly relative to said fluid displacement member, and said fluid displacement member having a radially extending flange limiting rearward movement of said movable wall member relative to said fluid displacement member, biasing means urging said movable wall rearwardly against said flange with generally predetermined force, a valve control member which when moved forwardly relative to said fluid displacement member produces a pressure differential across said movable wall urging said movable wall forwardly and a lever having one end in pivotal engagement with the outer portion of the movable wall, an intermediate point of said lever being in pivotal engagement with the outer edge of the flange and the other end of said lever having a lost motion connection with respect to said valve control member, said lever being constructed and arranged to move said other end of said lever toward said control member when said movable wall overcomes said biasing means to move out of engagement with said flange, and there being no connection between said lever and said control member which will transmit a force therebetween that changes significantly as movement of said lever takes up the lost motion in said lost motion connection, whereby substantially no reaction force is transmitted to said control member until a generally predetermined hydraulic pressure is reached in said hydraulic cylinder and said lever moves into abutment with said control member.

References Cited in the file of this patent

UNITED STATES PATENTS

| | | |
|---|---|---|
| 1,620,513 | Bragg et al. | Mar. 8, 1927 |
| 2,006,487 | Sorensen | July 2, 1935 |
| 2,275,697 | Stelzer | Mar. 10, 1942 |
| 2,331,238 | Schnell | Oct. 5, 1943 |
| 2,457,721 | Price | Dec. 28, 1948 |
| 2,470,748 | Thomas et al. | May 17, 1949 |
| 2,646,665 | Rockwell | July 28, 1953 |
| 2,685,170 | Price | Aug. 3, 1954 |